US 12,481,285 B2

United States Patent
Arlig et al.

(10) Patent No.: US 12,481,285 B2
(45) Date of Patent: Nov. 25, 2025

(54) DEFINITION OF BOUNDARY FOR A ROBOTIC WORK TOOL

(71) Applicant: HUSQVARNA AB, Huskvarna (SE)

(72) Inventors: Ulf Arlig, Bankeryd (SE); Martin Joelsson, Habo (SE)

(73) Assignee: HUSQVARNA AB, Huskvarna (SE)

(*) Notice: Subject to any disclaimer, the term of this patent is extended or adjusted under 35 U.S.C. 154(b) by 131 days.

(21) Appl. No.: 18/522,803

(22) Filed: Nov. 29, 2023

(65) Prior Publication Data
US 2024/0176350 A1 May 30, 2024

(30) Foreign Application Priority Data
Nov. 30, 2022 (SE) .................................... 2251396-4

(51) Int. Cl.
*G05D 1/22* (2024.01)
*G05D 1/00* (2006.01)

(52) U.S. Cl.
CPC .................. *G05D 1/0214* (2013.01)

(58) Field of Classification Search
CPC .... G05D 1/248; G05D 1/2295; G05D 1/2246; G05D 1/0214; G05D 1/617; G05D 2109/10; G05D 2105/15; G05D 2107/23
See application file for complete search history.

(56) References Cited

U.S. PATENT DOCUMENTS 6,438,455 B2 * 8/2002 Matsumoto ............ B25J 9/1674
700/83
6,459,956 B2 * 10/2002 Matsumoto ............... F16P 3/00
901/17
(Continued)

FOREIGN PATENT DOCUMENTS

CN 106873581 A 6/2017
EP 3495910 A1 6/2019
(Continued)

OTHER PUBLICATIONS

Jaekel et al., Robust and modular on-board architecture for future robotic spacecraft, 2014, IEEE, p. 1-11 (Year: 2014).*
(Continued)

*Primary Examiner* — McDieunel Marc
(74) *Attorney, Agent, or Firm* — Burr & Forman

(57) ABSTRACT

A method for use in a robotic work tool system (200) comprising a server (240) and a robotic work tool (100) arranged to operate in an operational area (205) based on a satellite navigation sensor (175), wherein the method comprises: receiving (410) one or more safety boundaries (220, 220-1, 220-2) and storing these in a safety map (120A-1) of the operational area (205), receiving (420) one or more zone boundaries (220-3, 220-4, 220-5, 220-6) and storing these in a zone map (120A-2) of the operational area (205), and operating (440) according to the one or more zone boundaries (220-3, 220-4, 220-5, 220-6) and the one or more safety boundaries (220, 220-1, 220-2), wherein the one or more zone boundaries (220-3, 220-4, 220-5, 220-6) are related to an operating schedule and the one or more safety boundaries (220, 220-1, 220-2) are related to safety concerns for the robotic work tool (100) and wherein the method is characterized in that the one or more zone boundaries (220-3, 220-4, 220-5, 220-6) are received by the server (240) and in that the method further comprises confirming (430) the one or more safety boundaries (220, 220-1, 220-2) on location in the operational area (205) prior to operating (440) according to the one or more safety boundaries (220, 220-1, 220-2).

20 Claims, 7 Drawing Sheets

(56) References Cited

U.S. PATENT DOCUMENTS

| | | | |
|---|---|---|---|
| 11,157,226 B2* | 10/2021 | Yamada | G02B 27/0172 |
| 12,232,441 B2* | 2/2025 | Robertsson | G05B 19/0426 |
| 2017/0001316 A1* | 1/2017 | Katayama | H05B 45/00 |
| 2018/0232593 A1* | 8/2018 | Tani | F16P 3/142 |
| 2018/0361585 A1 | 12/2018 | Williams et al. | |
| 2019/0129425 A1* | 5/2019 | Drexler | G01C 21/383 |
| 2019/0213415 A1* | 7/2019 | Hwang | G06F 3/0484 |
| 2019/0391597 A1 | 12/2019 | Dupuis | |
| 2021/0274705 A1 | 9/2021 | Martensson et al. | |
| 2021/0303745 A1* | 9/2021 | Linkowski | G06F 30/13 |
| 2022/0305658 A1* | 9/2022 | Årlig | G01S 19/49 |
| 2022/0322602 A1* | 10/2022 | Mårtensson | H04W 72/542 |

FOREIGN PATENT DOCUMENTS

| | | |
|---|---|---|
| EP | 3540552 A1 | 9/2019 |
| WO | 2022124966 A1 | 6/2022 |

OTHER PUBLICATIONS

Schafer et al., The Application of Design Schemata in Off-Road Robotics, 2013, IEEE, p. 1-24 (Year: 2013).*

Afanasiev et al., Synthesis Method for Sensor Systems and UAVs in the Problem of Monitoring Lightning, 2022, IEEE, p. 315-319 (Year: 2022).*

Marais et al., A Survey of GNSS-Based Research and Developments for the European Railway Signaling, 2017, IEEE, p. 2602-2618 (Year: 2017).*

Piromalis et al., A study of keeping low cost in sensors and ucontroller implementations for daily activities, 2016, IEEE, p. 1403-1407 (Year: 2016).*

Oche et al., Applications and Challenges of Artificial Intelligence in Space Missions, 2021, IEEE, p. 44481-444509 (Year: 2021).*

Liu et al., Robotic Communications for 5G and Beyond: Challenges and Research Opportunities, 2021, IEEE, p. 92-98 (Year: 2021).*

Binbin et al., Research progress on Autonomous Navigation Technology of Agricultural Robot, 2021, IEEE, p. 891-898 (Year: 2021).*

Swedish Office Action and Search Report for Swedish Application No. 2251396-4, Mailed on Jun. 19, 2023.

* cited by examiner

DEFINITION OF BOUNDARY FOR A ROBOTIC WORK TOOL

TECHNICAL FIELD

This application relates to a robotic work tool, such as a lawnmower, and a method for providing an improved definition of a boundary for an operational area for the robotic work tool.

BACKGROUND

Automated or robotic work tools such as robotic lawnmowers are becoming increasingly more popular and so is the use of the robotic work tool in various types of operational areas.

Such operational areas, in particular for robotic work tools being robotic lawnmowers, often include irregular surfaces and boundaries as well as several features, such as houses, trees, flower beds and so on. The operational areas may also comprise one or more work areas that are connected by transport paths.

As such, the traditional manners of defining a boundary is becoming more and more complicated and time-consuming. In order to reduce the time needed more and more advanced technologies are employed, which may be difficult for the average user to familiarize with, especially since the technical tools are only used at the installation phase of a robotic work tool.

Thus, there is a need for an improved manner of providing a simplified definition of a boundary for an operational area for a robotic work tool system.

SUMMARY

It is therefore an object of the teachings of this application to overcome or at least reduce those problems by providing a method for use in a robotic work tool system comprising a server and a robotic work tool arranged to operate in an operational area based on a satellite navigation sensor, wherein the method comprises: receiving one or more safety boundaries and storing these in a safety map of the operational area, receiving one or more zone boundaries defining boundaries for operating based on the satellite navigation sensor and storing these in a zone map of the operational area, and operating based on the satellite navigation sensor according to the one or more zone boundaries and the one or more safety boundaries, wherein the one or more zone boundaries are within at least one of the safety boundaries and the one or more safety boundaries are related to safety concerns for the robotic work tool and wherein the method is characterized in that the one or more zone boundaries defining boundaries for operating based on the satellite navigation sensor are received by the server and in that the method further comprises confirming the one or more safety boundaries on location in the operational area prior to operating according to the one or more safety boundaries.

In some embodiments the one or more safety boundaries are related to safety concerns for the robotic work tool wherein the one or more safety boundaries are defined by an operator steering or controlling the robotic work tool around the intended safety boundary according to the IEC60335-2-107 standard. In some such embodiments, the one or more safety boundaries are then confirmed by an operator, for example through an interface (such as an application) in the server (possibly being executed in a user equipment such as a mobile phone). In some alternative or additional embodiments the one or more safety boundaries are then confirmed through a proving demonstration under automatic position control.

In some embodiments at least one received boundary is an update of a boundary.

In some embodiments the method further comprises downloading the safety map to the robotic work tool.

In some embodiments the method further comprises downloading the zone map to the robotic work tool.

In some embodiments the method further comprises downloading the safety map and the zone map as a composite map to the robotic work tool.

In some embodiments the method further comprises confirming at least one of the one or more safety boundaries on location by remote-controlling the robotic work tool to follow the at least one safety boundary.

In some embodiments the method further comprises confirming at least one of the one or more safety boundaries on location by being downloaded to the robotic work tool through a short-range interface.

In some embodiments the method further comprises confirming at least one of the one or more safety boundaries on location by being receiving actions on a user interface of the robotic work tool.

In some embodiments the method further comprises confirming at least one of the one or more safety boundaries on location by a user that is physically in the operational area.

In some embodiments the method further comprises confirming at least one of the one or more safety boundaries on location by a user that is physically within a range of 1, 5 or 10 meters of the operational area.

In some embodiments the method further comprises the one or more safety boundaries being received by the server.

In some embodiments the method further comprises receiving the confirmation of the safety boundaries in the server.

In some embodiments the method further comprises receiving the confirmation of the zone boundaries in the server remotely from the operational area. In some embodiments receiving the confirmation remotely means that the server is not on location, for example at a distance of 50 or 100 meters from the location or that the confirmation is received through a long-range communication interface such as WiFi or a cellular interface such as LTE or 5G or other internet connection.

In some embodiments the method further comprises receiving the confirmation in the robotic work tool.

In some embodiments the robotic work tool is not configured with sensors for sensing a physical boundary.

In some embodiments the robotic work tool is a robotic lawnmower.

According to some aspects there is provided a computer-readable medium carrying computer instructions that when loaded into and executed by a controller of a robotic work tool system enables the robotic work tool system to implement the method according to herein.

According to some aspects there is provided a robotic work tool system comprising a server and a robotic work tool arranged to operate in an operational area based on a satellite navigation sensor, wherein a controller of the robotic work tool system is configured to: receive one or more safety boundaries and storing these in a safety map of the operational area, receive one or more zone boundaries defining boundaries for operating based on the satellite navigation sensor and storing these in a zone map of the operational area, and operate based on the satellite navigation sensor according to the one or more zone boundaries and the one or more safety boundaries, wherein the one or more zone boundaries are within at least one of the safety boundaries and the one or more safety boundaries are related to safety concerns for the robotic work tool and wherein the robotic work tool system is characterized in that the one or more zone boundaries defining boundaries for operating based on the satellite navigation sensor are received by the server and in that the controller of the robotic work tool system is further configured to confirm the one or more safety boundaries on location in the operational area prior to operating according to the one or more safety boundaries.

According to some aspects there is provided a robotic work tool arranged to operate in an operational area based on a satellite navigation sensor, wherein a controller of the robotic work tool is configured to: receive one or more safety boundaries, receive one or more zone boundaries defining boundaries for operating based on the satellite navigation sensor, and operate based on the satellite navigation sensor according to the one or more zone boundaries and the one or more safety boundaries, wherein the one or more zone boundaries are within at least one of the safety boundaries and the one or more safety boundaries are related to safety concerns for the robotic work tool and wherein the robotic work tool is characterized in that the one or more zone boundaries defining boundaries for operating based on the satellite navigation sensor are received from a server and in that the controller of the robotic work tool is further configured to confirm the one or more safety boundaries on location in the operational area prior to operating according to the one or more safety boundaries.

In some embodiments the controller is further configured to receive the safety boundaries from the server prior to receiving the confirmation of the safety boundaries on location.

It is also an object of the teachings of this application to overcome the problems by providing a computer-readable medium carrying computer instructions that when loaded into and executed by a controller of a computing device enables the computing device to implement the method according to herein.

In one embodiment the computing device is a server.

In one embodiment the computing device is a user equipment.

In one embodiment the robotic work tool system further comprises a server, wherein the server comprises the controller.

Further embodiments and aspects are as in the attached patent claims and as discussed in the detailed description.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

Figure 1:
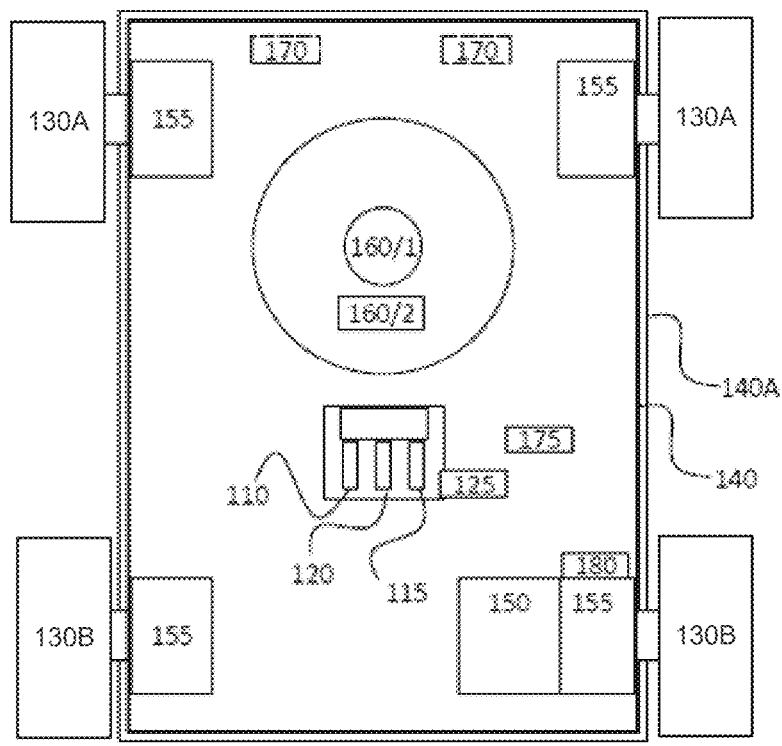
FIG. 1 shows a schematic view of the components of an example of a robotic work tool being a robotic lawnmower according to some example embodiments of the teachings herein.

The disclosed embodiments will now be described more fully hereinafter with reference to the accompanying drawings, in which certain embodiments of the invention are shown. This invention may, however, be embodied in many different forms and should not be construed as limited to the embodiments set forth herein. Like reference numbers refer to like elements throughout.

It should be noted that even though the description given herein will be focused on robotic lawnmowers, the teachings herein may also be applied to robotic watering tools, robotic golf ball collectors, robotic mulchers, and robotic grinders to mention a few examples.

FIG. 1A shows a schematic overview of a robotic work tool 100, here exemplified by a robotic lawnmower 100. The robotic work tool 100 may be a multi-chassis type or a mono-chassis type (as in FIG. 1A). A multi-chassis type comprises more than one main body parts that are movable with respect to one another. A mono-chassis type comprises only one main body part.

It should be noted that robotic lawnmower may be of different sizes, where the size ranges from merely a few decimetres for small garden robots, to even more than 1 meter for large robots arranged to service for example airfields.

In some embodiments, and as will be discussed below, the robotic work tool is a semi-controlled or at least supervised autonomous work tool, such as farming equipment or large lawnmowers, for example riders or comprising tractors being autonomously controlled.

It should also be noted that the robotic work tool is a self-propelled robotic work tool, capable of autonomous navigation within an operational area, where the robotic work tool propels itself across or around the operational area in a pattern (random or predetermined).

The robotic work tool 100, exemplified as a robotic lawnmower 100, has a main body part 140, possibly comprising a chassis 140 and an outer shell 140A, and a plurality of wheels 130 (in this example four wheels 130, but other number of wheels are also possible, such as three or six).

The main body part 140 substantially houses all components of the robotic lawnmower 100. At least some of the wheels 130 are drivably connected to at least one electric motor 155 powered by a battery 150. It should be noted that even if the description herein is focused on electric motors, combustion engines may alternatively be used, possibly in combination with an electric motor. In the example of FIG.

1, each of the wheels 130 is connected to a common or to a respective electric motor 155 for driving the wheels 130 to navigate the robotic lawnmower 100 in different manners. The wheels, the motor 155 and possibly the battery 150 are thus examples of components making up a propulsion device. By controlling the motors 155, the propulsion device may be controlled to propel the robotic lawnmower 100 in a desired manner, and the propulsion device will therefore be seen as synonymous with the motor(s) 150. It should be noted that wheels 130 driven by electric motors is only one example of a propulsion system and other variants are possible such as caterpillar tracks.

The robotic lawnmower 100 also comprises a controller 110 and a computer readable storage medium or memory 120. The controller 110 may be implemented using instructions that enable hardware functionality, for example, by using executable computer program instructions in a general-purpose or special-purpose processor that may be stored on the memory 120 to be executed by such a processor. The controller 110 is configured to read instructions from the memory 120 and execute these instructions to control the operation of the robotic lawnmower 100 including, but not being limited to, the propulsion and navigation of the robotic lawnmower.

The controller 110 in combination with the electric motor 155 and the wheels 130 forms the base of a navigation system (possibly comprising further components) for the robotic lawnmower, enabling it to be self-propelled as discussed.

The controller 110 may be implemented using any suitable, available processor or Programmable Logic Circuit (PLC). The memory 120 may be implemented using any commonly known technology for computer-readable memories such as ROM, FLASH, DDR, or some other memory technology.

The robotic lawnmower 100 is further arranged with a wireless communication interface 115 for communicating with other devices, such as a server, a personal computer, a smartphone, the charging station, and/or other robotic work tools. Examples of such wireless communication devices are Bluetooth®, WiFi® (IEEE802.11b), Global System Mobile (GSM) and LTE (Long Term Evolution), to name a few. The robotic lawnmower 100 may be arranged to communicate with a user equipment (not shown but will be regarded as being an example of a server, as an example of a connected device) as discussed in relation to FIG. 2 below for providing information regarding status, location, and progress of operation to the user equipment as well as receiving commands or settings from the user equipment. Alternatively or additionally, the robotic lawnmower 100 may be arranged to communicate with a server (referenced 240 in FIG. 2) for providing information regarding status, location, and progress of operation as well as receiving commands or settings.

In some embodiments the robotic work tool 100 is arranged with a user interface 125 trough which user commands may be received, such as for remote-controlling the robotic work tool 100 and/or to confirm any boundary downloaded.

In some embodiments the robotic work tool 100 is arranged to receive some or all such user commands through the communication interface 115, such as for remote-controlling the robotic work tool 100 and/or to confirm any boundary downloaded.

The robotic lawnmower 100 also comprises a work tool 160, which in the example of the robotic lawnmower 100 is a grass cutting device 160, such as a rotating blade 160/2 driven by a cutter motor 160/1. In embodiments where the robotic work tool 100 is exemplified as an automatic grinder, the work tool 160 is a rotating grinding disc.

The robotic lawnmower 100 comprises a satellite signal navigation sensor 175 configured to provide navigational information (such as position) based on receiving one or more signals from a satellite—possibly in combination with receiving a signal from a base station (also sometimes referred to as a beacon). In some embodiments the satellite navigation sensor 175 is a GPS (Global Positioning System) device or other Global Navigation Satellite System (GNSS) device. In some embodiments the satellite navigation sensor 175 is a RTK sensor.

Figure 2:
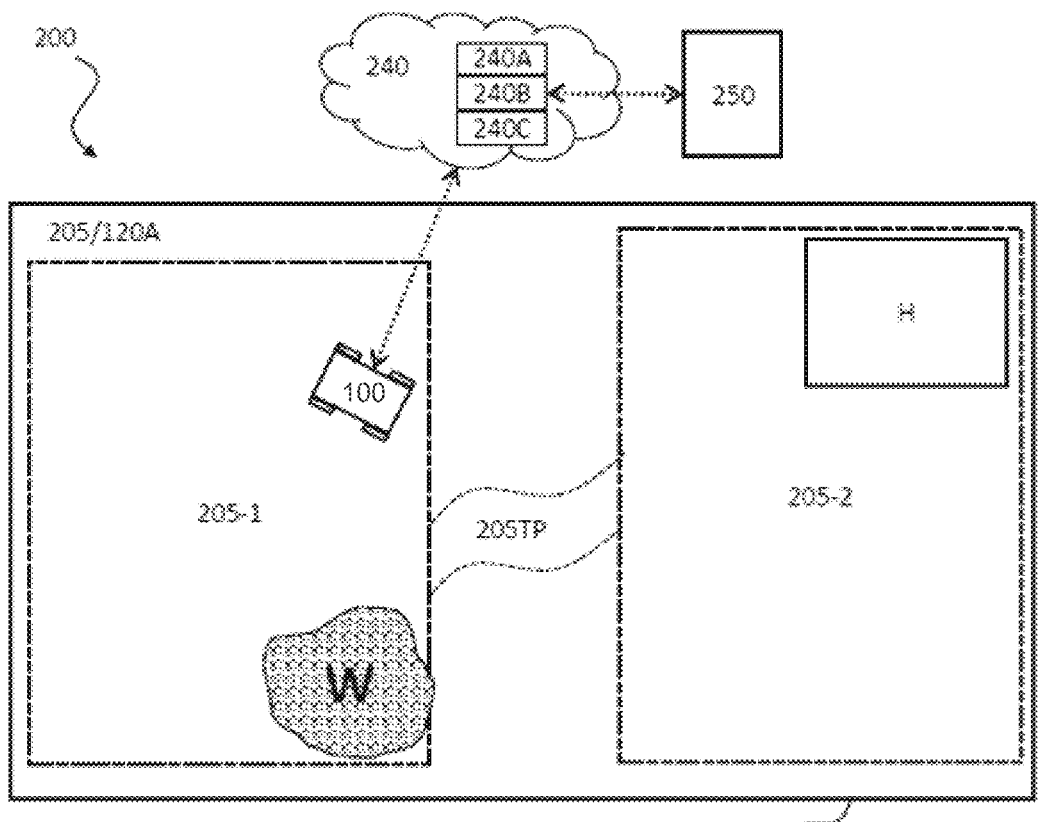
FIG. 2 shows a schematic view of a robotic work tool system according to some example embodiments of the teachings herein.

This enables the robotic work tool to operate in an operational area bounded by a virtual border (referenced 220 in FIG. 2).

In some embodiments, the robotic lawnmower 100 also comprises deduced reckoning sensors 180. The deduced reckoning sensors may be odometers, accelerometers or other deduced reckoning sensors. In some embodiments, the robotic work tool comprises a visual odometry sensor 180, possibly comprised in or connected to the other deduced reckoning sensors 180.

In some embodiments, the deduced reckoning sensors are comprised in the propulsion device, wherein a deduced reckoning navigation may be provided by knowing the current supplied to a motor and the time the current is supplied, which will give an indication of the speed and thereby distance for the corresponding wheel.

The deduced reckoning sensors 180, especially in combination with the visual odometry sensor, enables the root to operate according to a map of the operational area. In some such embodiments, the navigation is based on SLAM, and in some embodiments, where a visual odometry sensor (such as a camera) is utilized, the navigation is based on V-SLAM.

For enabling the robotic lawnmower 100 to navigate with reference to a wire, such as a boundary wire or a guide wire, emitting a magnetic field caused by a control signal transmitted through the wire, the robotic lawnmower 100 is, in some embodiments, configured to have at least one magnetic field sensor 170 arranged to detect the magnetic field and for detecting the wire and/or for receiving (and possibly also sending) information to/from a signal generator. In some embodiments, such a magnetic boundary is used to provide a border (not shown explicitly in FIG. 2, but deemed to be included in the boundary 220) enclosing an operational area (referenced 205 in FIG. 2).

In embodiments where the robotic work tool is arranged to navigate according without a magnetic border, the robotic work tool 100 is specifically related to chapter 22.104 of the safety standard IEC60335-2-107 relating to robotic work tools navigating based on satellite navigation without a magnetic or other physical border, and specifically how the safety border should be defined, namely where it is only possible to programme or define a working area, such as an operational area 205 or a work area 205-1, into storage by driving the robotic lawnmower around (the inside of) the boundary using a manual controller, with the cutting means not operating. Once an area has been input, i.e. the safety boundary for that area has been defined, it shall not be possible to start mowing before completing a proving demonstration under automatic position control (again with the cutting means not operating), which shall need to be confirmed by the operator before being stored or used for mowing. In some alternative or additional embodiments, and as per later versions of the mentioned standard, the (one or more) safety boundary is confirmed by an operator, for example through an interface (such as an application) in the server (possibly being executed in a user equipment such as a mobile phone). In some such embodiments the interface may present a representation of the boundary so that the operator can visually confirm that the boundary is where it is intended to be. The visual confirmation may be done by comparing features on the representation on the device with features in the area of the operational area that the operator can see.

The robotic lawnmower 100 is arranged to operate according to a map application (indicated in FIG. 2 and referenced 120A) representing one or more operational area(s) possibly including one or more work areas 205-1, 205-2 and possibly transport paths 205TP between these work areas 205-1, 205-2 (and possibly the surroundings of the operational area(s)) as well as features of the operational area(s) stored in the memory 120 of the robotic lawnmower 100. In some embodiments, the map is also or alternatively stored in the memory of a server (referenced 240 in FIG. 2). In some embodiments, the map may be generated or supplemented as the robotic lawnmower 100 operates or otherwise moves around in the operational area 205. In some embodiments, the map may be generated or supplemented in an application (or other software) executed in the server 240. In some such embodiments the map is generated based on information received from the robotic work tool 100. In some embodiments the map is generated based on information received from a user, such as the user drawing the map in a drawing interface. In some embodiments the map is generated based on map information received from another application such as from an internet service. In one such embodiment the map is based on satellite map data. In some embodiments, the map is based on map information that is supplemented by the user in a drawing or other application interface.

As a skilled person would understand, the map at least as relates to the features in the map may be generated in a number of manners and the exact creation of the map is not at the core of the teachings herein and will thus not be exemplified further.

In some such embodiments, the map application is downloaded, possibly from the server. And, in some embodiments the map is generated by the robotic work tool 100 and stored in the memory of the robotic work tool 100, whereby supplementing features especially as regards the boundary are downloaded possibly from the server.

In some embodiments the robotic work tool is arranged or configured to traverse and operate in operational areas that are not essentially flat, but contain terrain that is of varying altitude, such as undulating, comprising hills or slopes or such. The ground of such terrain is not flat and it is not straightforward how to determine an angle between a sensor mounted on the robotic work tool and the ground. The robotic work tool is also or alternatively arranged or configured to traverse and operate in an operational area that contains obstacles that are not easily discerned from the ground. Examples of such are grass or moss-covered rocks, roots or other obstacles that are close to ground and of a similar colour or texture as the ground. The robotic work tool is also or alternatively arranged or configured to traverse and operate in an operational area that contains obstacles that are overhanging, i.e. obstacles that may not be detectable from the ground up, such as low hanging branches of trees or bushes. Such a garden is thus not simply a flat lawn to be mowed or similar, but an operational area of unpredictable structure and characteristics. The operational area exemplified with referenced to FIG. 2, may thus be such a non-uniform operational area as disclosed in this paragraph that the robotic work tool is arranged to traverse and/or operate in.

FIG. 2 shows a robotic work tool system 200 in some embodiments. The schematic view is not to scale. The robotic work tool system 200 comprises one or more robotic work tools 100 according to the teachings herein arranged to operate in one or more operational areas 205 bounded by a boundary 220. It should be noted that the operational area 205 shown in FIG. 2 is simplified for illustrative purposes.

The view of the operational area 205 is also intended to be an illustration or graphical representation of the map application 120A discussed in the above.

A computing device, such as a server, 240 is shown as an optional connected device for the robotic work tool 100 to communicate with—possibly for receiving maps or map updates. The server 240 comprises a controller 240A for controlling the operation of the server 240, a memory 240B for storing instructions and data relating to the operation of the server 240 and a communication interface 240C. The controller, the memory and the communication interface for the computing device may be of similar types as discussed in relation to FIG. 1 for the robotic work tool 100.

The communication interface 240C is, in some embodiments, configured for enabling the server 240 to communicate with other devices, such as other servers and/or the robotic work tool(s) 100, and/or a User Equipment such as a mobile phone, tablet computer or other personal computer. In some embodiment the server is connected to a computing device, and in some embodiments, the server is comprised in a computing device such as a User Equipment, the User Equipment being another example of a computing device. In some embodiments, the server 240 is comprised in the robotic work tool 100.

The server 240 thus represents (as in being able to execute) an application for defining boundaries for a robotic work tool 100 system 200.

The server 240 is configured to display an application interface, either on a display connected to the server 240, such as a display 250 (see FIG. 3A) of a User Equipment or other computing device (for example a desktop computer) or a display of the robotic work tool 100.

As with FIG. 1, the robotic work tool(s) 100 is exemplified by a robotic lawnmower, whereby the robotic work tool system 200 may be a robotic lawnmower system or a system comprising a combinations of robotic work tools, one being a robotic lawnmower, but the teachings herein may also be applied to other robotic work tools adapted to operate within an operational area.

As is shown in FIG. 2 there may be obstacles such as houses, structures, trees to mention a few examples in the operational area 205. In FIG. 2 such obstacles are indicated and referenced H (as in house) and W (as in water).

As discussed in relation to FIG. 1, the operational area is bounded by a boundary 220. The boundary 220 is primarily a virtual boundary, but may in some embodiments be combined with a physical (or magnetic) boundary.

For the robotic work tool 100 to be able to operate efficiently and according to modern requirements, the boundary 220 will comprise several (sub-) boundaries for various work areas 205-1, 205-2, transport paths 205TP as well as stay out (or forbidden) areas. In the example of FIG. 2, the body of water may be in one such forbidden area. And it is these (sub-) boundaries that are especially difficult for a user to define. The operational area 205 is thus, in some embodiments, an area in which the robotic work tool is intended to operate, which operational area may include one or more work areas 205-1, 205-2 in which the robotic work tool is intended to perform work. In some embodiments one or more safety boundaries, i.e. boundaries that the robotic work tool is not allowed to cross, are arranged around the work areas, and may thus be inside the boundary for the operational area. In some such embodiments, the boundary for the operational area may even be a non-existent or imaginary boundary that is not defined for the robotic work tool and also unnecessary for the robotic work tool as the robotic work tool will not be able to reach that boundary as the robotic work tool is bounded to smaller area(s) by the safety boundaries.

Figure 3A:
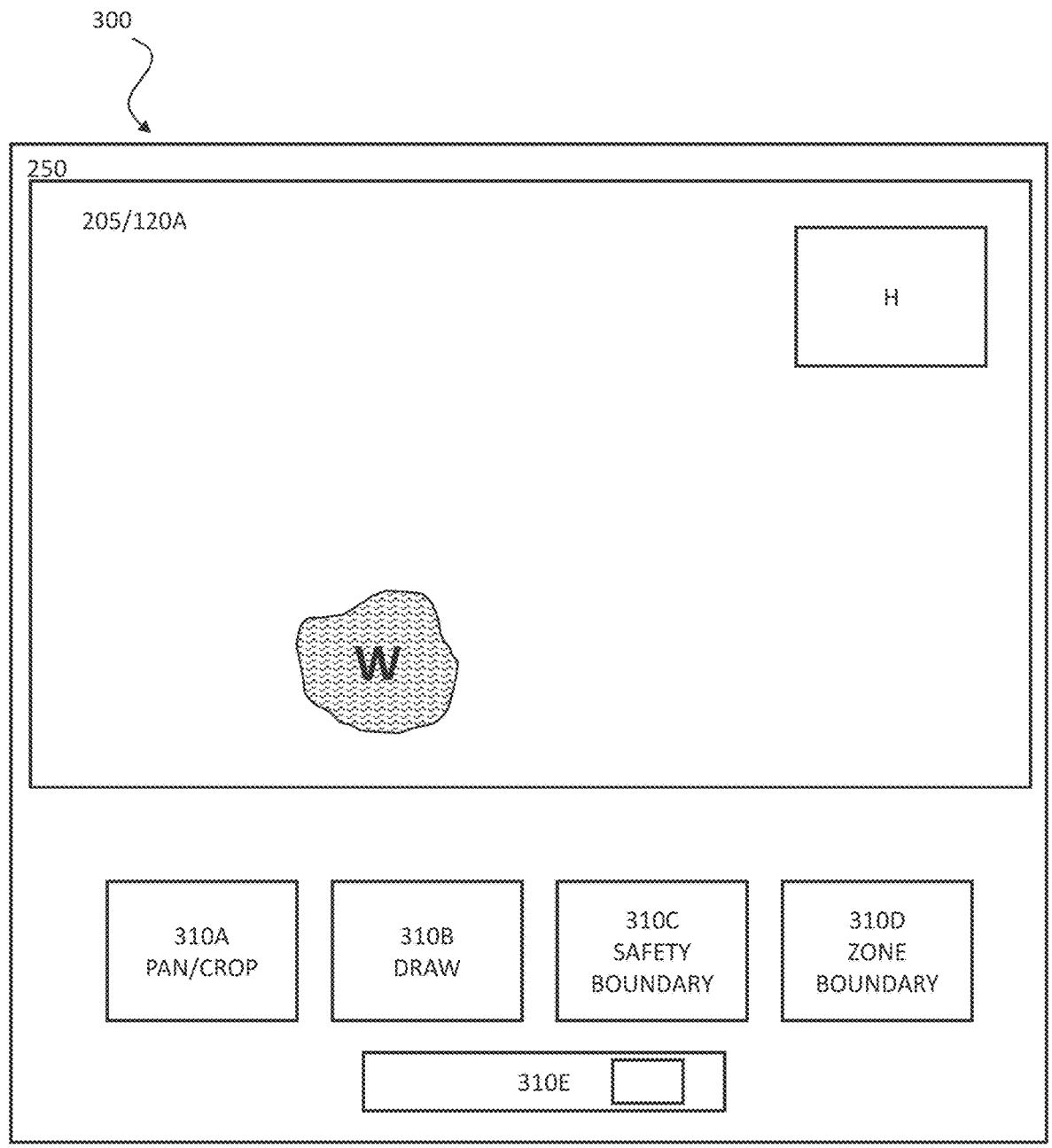
FIGS. 3A, 3B, 3C, 3D and 3E each shows a schematic view of a display in a robotic work tool system according to some example embodiments of the teachings herein.

FIG. 3A shows a schematic view of a display 250 showing one example of an application interface 300, wherein a graphical representation of the map 120A of the operational area 205 is displayed. In the following there will be made no specific difference between a displayed graphical representation of an entity and the entity itself, as the difference would be apparent to a skilled reader as well as obvious from the context. In some embodiments, one or more controls 310 are also provided by the application interface.

The display shows the main boundary 220 being a safety boundary encompassing the whole operational area 205.

In the example of FIG. 3A, the display 250 shows the operational area 205. In some embodiments the operational area 205 is shown as a satellite view or image of the operational area. Such a satellite image can easily be downloaded via a third-party server based on the coordinates for the operational area, which are also easily retrieved by simply turning on the robotic work tool 100 and placing it in or close to the operational area 205. The satellite image retrieved may be for the operational area or for a larger area encompassing the operational area, whereby the application interface 300 is configured with user controls 310A for adapting the satellite view, such as through panning and/or cropping, to show the operational area 205. For the example where the operational area is a garden, a user may receive a satellite image of a part of the neighbourhood, whereby the user can pan and/or crop so that the garden is shown in the display. Such operations are easily understood and require no further details.

In some embodiments the operational area 205 is shown as another type of view or image of the operational area. In some such embodiments, the image is a user-defined image, where a user is enabled through drawing controls 310B to draw or otherwise define the operational area and to input coordinates for such features. In some embodiments, the coordinates for the boundary or for a point relative the boundary is input and other coordinates are determined based on the boundary coordinates. In some embodiments, the image or view is generated by the robotic work tool 100 traversing the operational area—autonomously or under user control, or partly autonomously and partly under user control—whereby coordinates for borders and for features are detected and stored.

In the example of FIG. 3A one or more interface controls 310C, 310D are shown for enabling a user to input a borders, possibly of different types or categories. In this example two controls are shown; one for inputting a safety boundaries 310C, and one for inputting other boundaries 310D, such other boundaries hereafter being referred to as site-specific boundaries. The safety boundaries are thus of a safety category and the zone boundaries are of a zone category.

It should be noted that these controls, the number of controls, the associated functions are only examples and many variations exist, and the example shown is mainly for illustrative purposes. The controls may be touch-based virtual control in the case the display 250 is a touch display. The controls may be non-touch-based, such as using a mouse or other cursor controlling device, regardless whether the display 250 a touch display or not.

Examples of safety boundaries are the boundary 220 and forbidden areas, such as for the body of water. One definition of a safety boundary is a boundary that may not be traversed or crossed due to safety reasons. In some embodiments the work area boundaries may also be safety boundaries, in which embodiments the boundary 220 may (or may not) be left out As a zone boundary is within the safety boundary, it is covered by the safety of the safety boundary and can thus be updated at will without endangering the safety of the robotic work tool system.

Examples of zone boundaries are the boundaries for the work areas 205-1, 205-2 when the work areas are defined as an area where work is only to be done in a scheduled time, but where the robotic work tool may operate outside the work area at other times. One definition of a safety boundary is a boundary that may not be traversed or crossed due to work scheduling reasons. One definition of a zone boundary is any boundary that is within a safety boundary.

In some embodiments the safety boundaries are stored in a safety map (also referred to as a site map) 120A-1 and the zone boundaries are stored in a zone map 120A-2. This enables a user and the robotic work tool system to easily determine which boundary belongs to which category and ensures that any boundary generated is generated in the correct category. The safety map thus shows all boundaries related to safety, and the zone map shows all boundaries related to various zones within the safety areas (areas bounded by a safety boundary).

In some embodiments the safety map 120A-1 and the zone map 120A-2 are displayed as being overlaid in a composite map view 120A. In some such embodiments the boundaries of the various maps are displayed using different colors, highlighting or dashed lines to enable a user to more clearly and directly differentiate between the categories of boundaries.

In some embodiments the safety map 120A-1 and the zone map 120A-2 are displayed as separate maps. In some such embodiments the safety map 120A-1 and the zone map 120A-2 are displayed at the same time next to each other. This enables for a view of both maps at the same time so as to be able to compare. In some alternative such embodiments the safety map 120A-1 and the zone map 120A-2 are displayed in different display views. This enables for a more detailed view of a map as the map may take up a larger portion of the display.

In some embodiments, the display interface comprises controls 310E for toggling or switching between showing a composite view, the safety map 120A-1 and the zone map 120A-2 next to each other or the safety map 120A-1 in one view and the zone map 120A-2 in another view.

Figure 3B:
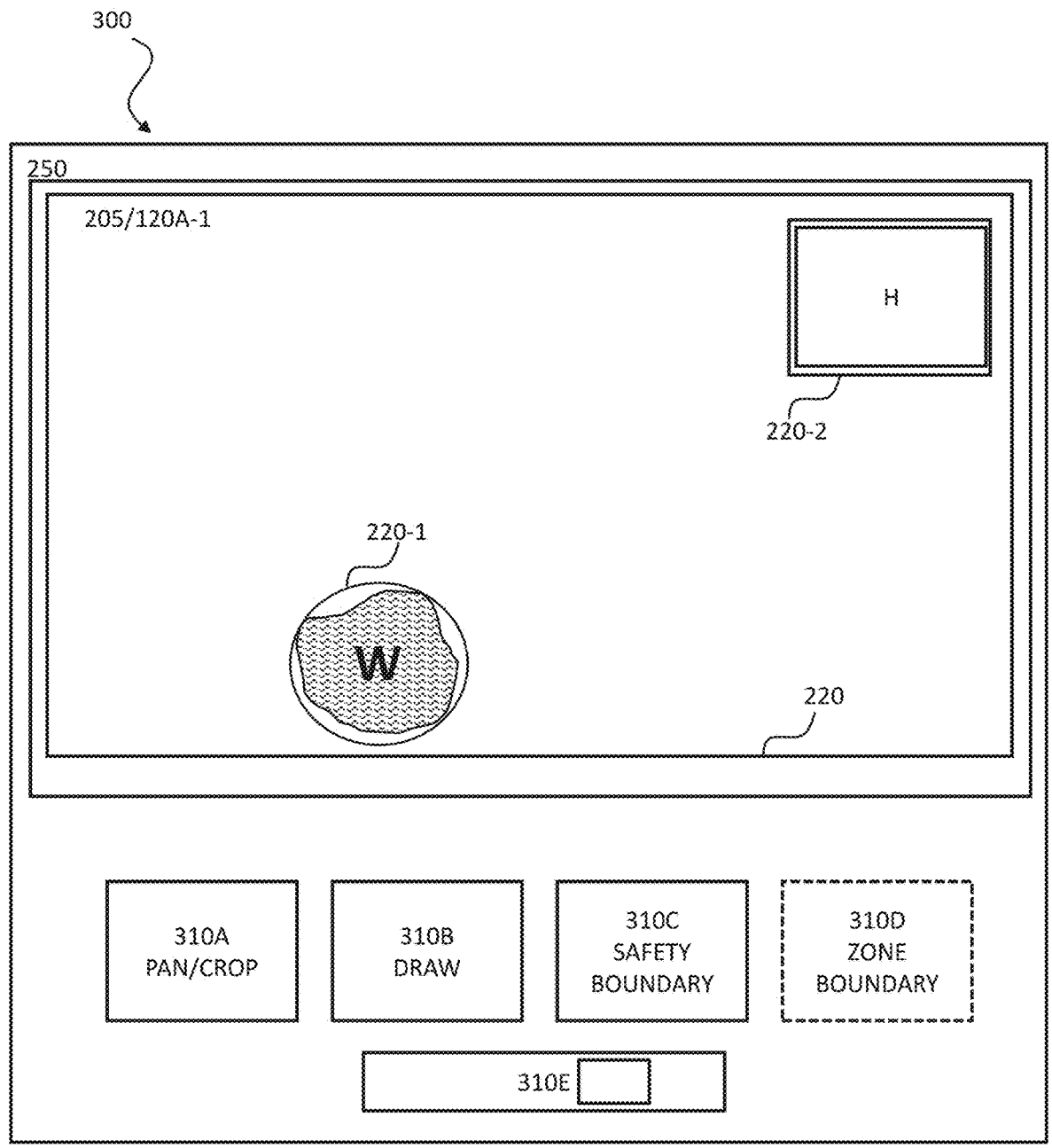

FIG. 3B shows an example where the safety map 120A-1 is displayed (alone) and where one or more (in this example three) safety boundaries 220, 220-1 and 220-2 have been defined in the display view 250. As is illustrated in FIG. 3B, the controls offered to a user may be different depending on which view is shown and in the example of FIG. 3B, the control for zone boundaries 310D is shown as optional by being shown with dashed lines. One safety boundary being the boundary 220 around the operational area 205, thereby providing safety in preventing the robotic work tool 100 from escaping, one safety boundary 220-1 being a forbidden area covering the body of water W, thereby providing safety in preventing the robotic work tool 100 from falling in and becoming damaged, and one safety boundary 220-2 being a forbidden area covering the house H, thereby providing safety in preventing the robotic work tool 100 from colliding unnecessarily with the house while operating and becoming damaged.

This enables for providing safety areas also for features that are not otherwise defined in the map 120A application. In prior art systems, many times the robotic work tool has to spend time detecting various features in order for them to become part of the map. By simply enabling the user to define boundaries without actually defining the feature, the boundaries may be provided or updated much more simply and efficiently.

In the embodiments where the robotic work tool 100 does not operate according to a physical, such as a magnetic, boundary (as discussed above in relation to the IEC60335-2-107 standard), the safety boundaries have to be defined on location or at least verified(confirmed) on location by the robotic work tool following the boundary. This requires an operator to actually be on location to see that the safety boundaries coincide with the natural features. In some embodiments, the safety map 120A-1 therefore needs to be downloaded to the robotic work tool 100 before being at least confirmed. The safety boundaries may thus be defined or adapted at any location, but will not be accepted by the robotic work tool 100 until confirmed on location.

The safety boundaries are in some embodiments confirmed by being defined or drawn on location. This can be determined based on the coordinates of the computing device on which the boundaries are being defined. In some such embodiments the boundaries are then confirmed by the robotic work tool following the boundary under the supervision of an operator.

The safety boundaries are in some embodiments confirmed on location by the robotic work tool 100 being remote-controlled to follow the boundaries, either to generate them by tracking the movements or to confirm them by ensuring that the boundaries are followed.

The safety boundaries are in some embodiments confirmed on location by being downloaded to the robotic work tool 100 through a short-range interface such as any wired interface or for example NFC, RFID or Bluetooth which requires a user to be on location.

The safety boundaries are in some embodiments confirmed on location by being confirmed through actions on the user interface of the robotic work tool 100, such as by a user being prompted to confirm the latest download.

This enables for a safety boundary to be defined and/or updated on a computing device, then downloaded to the robotic work tool 100 and thereafter confirmed on location. It should be noted that the safety boundaries may be confirmed prior to being downloaded, but only on location.

One definition of on location is through a user of a device (the robotic work tool 100 or the server 240 in whatever form it takes) being physically in (or within a range of 1, 5 or 10 meters of) the operational area 205.

Figure 3C:
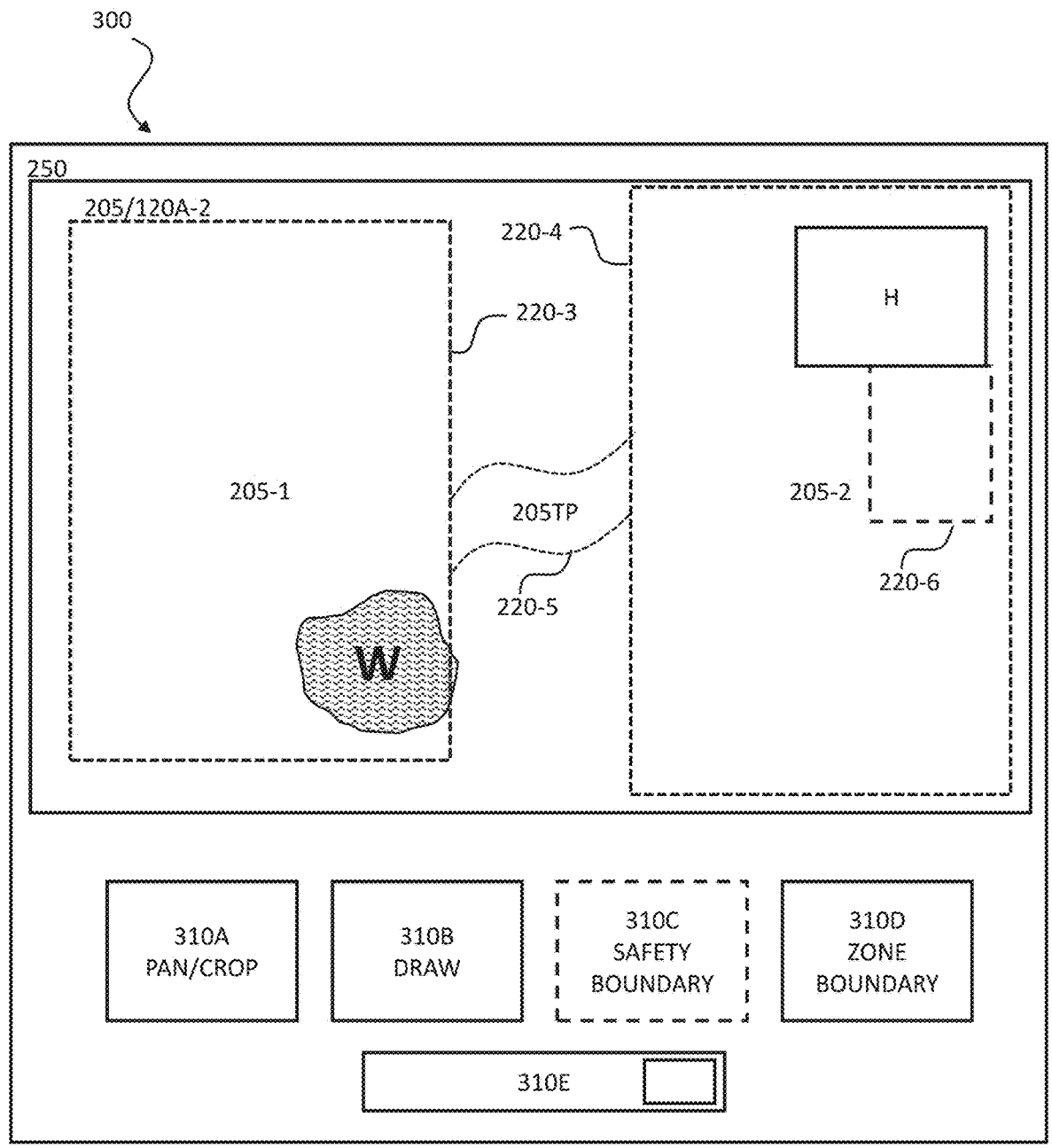

FIG. 3C shows an example where one or more (in this example four) zone boundaries have been defined in the display view 250. As can be seen in the illustration, the control 310E has been changed to illustrate that a different view has been selected and as is also illustrated in FIG. 3C, the controls offered to a user may be different depending on which view is shown and in the example of FIG. 3C, the control for safety boundaries 310C is shown as optional by being shown with dashed lines.

Two boundaries 220-3, 220-4 have been defined for defining the two work areas 205-1, 205-2, where these boundaries enable the robotic work tool 100 to operate in different areas at different times according to a schedule. And one boundary 220-5 has been defined for defining the transport path 205TP where this boundary enables the robotic work tool 100 to travel between different work areas at different times according to a schedule. And one boundary 220-6 has been defined for defining a stay out zone where this boundary enables the robotic work tool 100 to avoid a specific area at specific times according to a schedule, such as when a car is (expected to be) parked therein.

In the embodiments where the robotic work tool 100 does not mandatorily operate according to a physical boundary (such as a magnetic boundary) as discussed in relation to the IEC60335-2-107 standard and as the zone boundaries are not related to safety, the zone boundaries may be defined and/or updated remotely and also confirmed remotely as they do not require any confirmation on location. In some embodiments the teachings herein thus further comprises receiving the confirmation of the zone boundaries in the server remotely from the operational area. In some embodiments receiving the confirmation remotely means that the server is not on location, for example at a distance of 50 or 100 meters from the location or that the confirmation is received through a long-range communication interface such as WiFi or a cellular interface such as LTE or 5G or other internet connection.

For the purpose of the teachings herein, a robotic work tool 100 that does not operate according to a physical boundary is defined as a robotic work tool operating primarily on a virtual boundary, which includes robotic work tools operating based solely on satellite navigation sensors 175, solely on deduced reckoning sensors 180 (possibly including SLAM) or based on a combination of satellite navigation sensors 175 and deduced reckoning sensors 180 (possibly including SLAM).

In some embodiments a robotic work tool 100 that does not operate according to a physical boundary is to be understood as a robotic work tool 100 that does not mainly or primarily rely on the physical boundary, such as a magnetic boundary. Other boundaries may be used for navigating such as walls or other physical boundaries being physical structure boundaries (such as walls and so on): In such embodiments the robotic work tool is defined as a robotic work tool operating primarily although possibly not solely on a virtual boundary, which includes robotic work tools operating based mainly on satellite navigation sensors 175, mainly on deduced reckoning sensors 180 (possibly including SLAM) or based on a combination of satellite navigation sensors 175 and deduced reckoning sensors 180 (possibly including SLAM). This also includes combinations with operating based on object or obstacle sensing sensors, such as collision sensors. This also or alternatively includes combinations with operating based on visual navigation.

The safety boundaries discussed herein are thus in some embodiments virtual (for navigation using satellite sensors and/or deduced reckoning sensors). And in some embodiments they are magnetic. And in some embodiments they are physical structures. And in some embodiments they are a combination of some or any of these alternatives.

The zone boundaries are, however, for use with navigation using satellite sensors and/or deduced reckoning sensors.

The zone boundaries may thus be downloaded and confirmed for operation to the robotic work tool 100 from a remote computing device, such as the server 240.

Figure 3D:
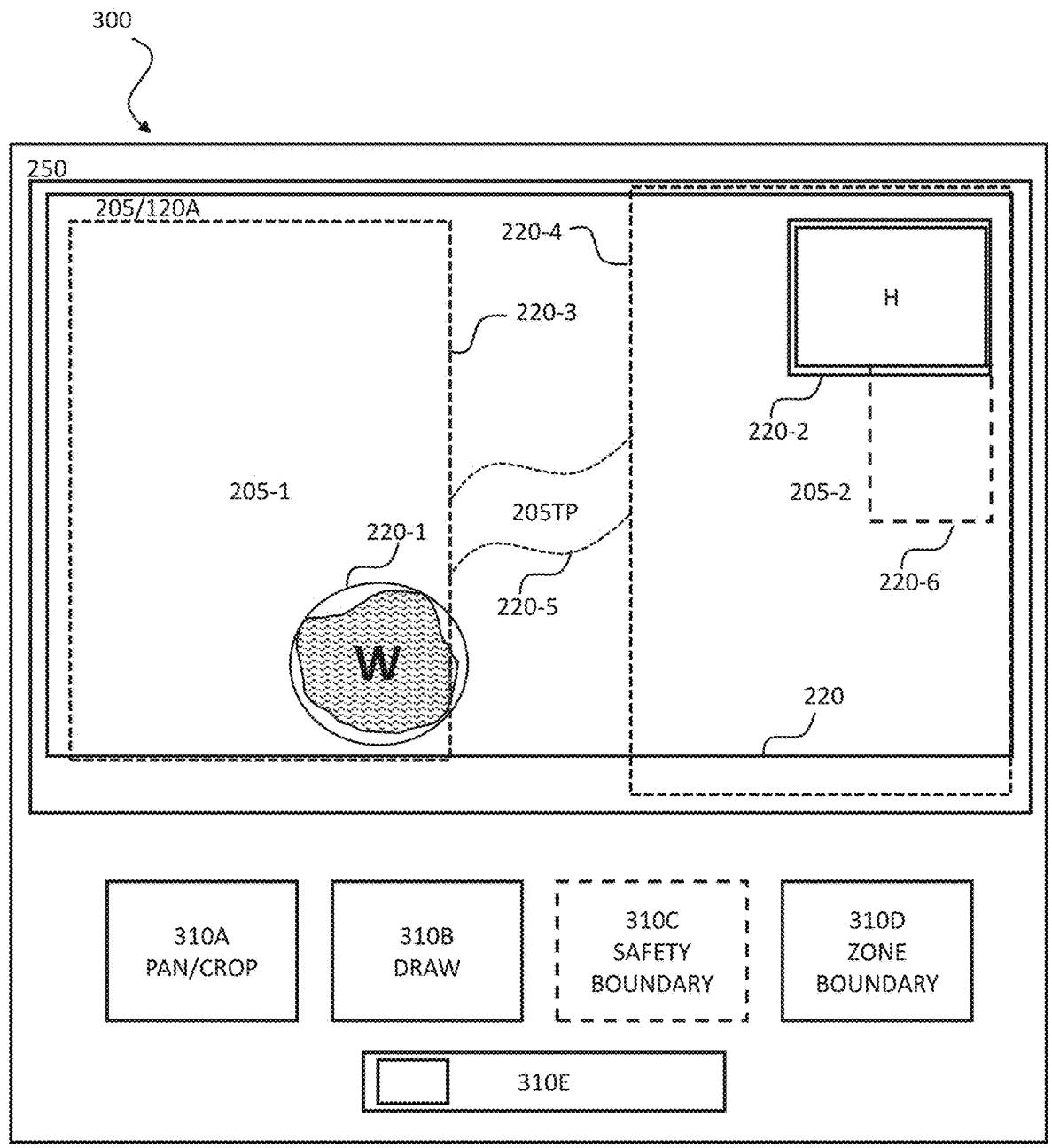

FIG. 3D shows an example where a composite map view 120A is shown where the safety boundaries 220, 220-1, 220-2 of the safety map 120A-1 are shown together with the zone boundaries 220-3, 220-4, 220-5, 220-6 of the zone map 120A-2. As can be seen in the illustration, the control 310E has been changed to illustrate that a different view has been selected. As can also be seen, the different categories of boundaries are displayed differently so that they may easily be differentiated by a user. In this example, the safety boundaries 220, 220-1, 220-2 of the safety map 120A-1 are shown with full lines and the zone boundaries 220-3, 220-4, 220-5, 220-6 of the zone map 120A-2 are shown with dashed lines.

As can be seen in FIG. 3D the user may have defined some zone boundaries roughly and rather incorrectly. In the example of FIG. 3D this can be seen in that the zone boundaries 220-3, 220-4 for the work areas extend beyond or outside the safety boundary 220. However, by configuring the robotic work tool 100 or the server 240 to prioritize the safety boundaries over the zone boundaries, the robotic work tool 100 will not cross the safety boundary regardless of what the zone boundaries state. In some embodiments the robotic work tool 100 is configured to determine the prioritization based on the received safety boundary and zone boundary.

In some embodiments the server 240 or the robotic work tool 100 is configured to determine the prioritization based on the received safety boundary and zone boundary by adapting the zone boundary so that it does not cross a safety boundary.

Figure 3E:
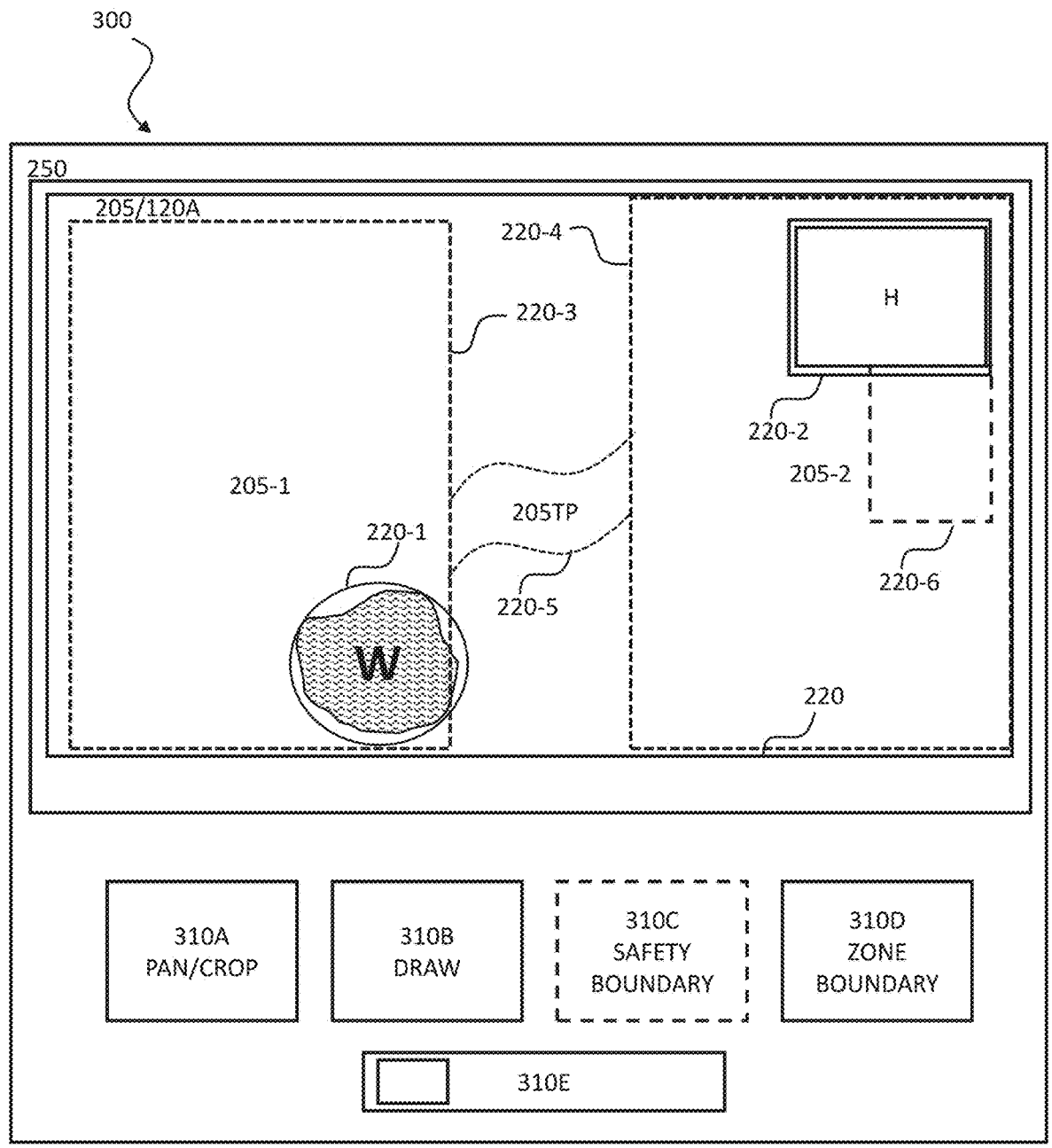

FIG. 3E shows an example, where the zone boundaries have been adapted to not cross a safety boundary. The view displayed in FIG. 3E thus represents the (composite) map that the robotic work tool 100 will navigate according to after the safety boundaries have been confirmed on location. It should be noted that depending on the embodiment implemented, this view may not be available to show the user.

In some embodiments, a zone boundary will be adapted as it is defined or updated by not allowing a user to define it outside the boundary. For a drawing interface, the drawing of the boundary may not exceed the safety boundary regardless of the input given. The zone boundary will thus "snap back" to be inside the safety boundary or stop at the safety boundary.

This allows a user to define or update a zone boundary without worrying or paying too much attention to details for the zone boundary which enables for zone boundaries to be defined simply and efficiently.

As the two maps have been downloaded to the robotic work tool 100 and the safety map 120A-1 has been confirmed (or rather the safety boundaries have been confirmed) on location, the robotic work tool 100 will operate according to both the safety boundaries and the zone boundaries.

It should be noted that a complete map needs not be downloaded, but in some embodiments only an update to the map is downloaded. However, any update to a safety boundary of the safety map will have to be confirmed on location.

As mentioned above, in some embodiments the safety map 120A-1 is one separate map and the zone map 120A-2 is one separate map. In some embodiments the safety map 120A-1 is one separate map and the zone map 120A-2 are parts (the different categories of boundaries being he different parts) of the same composite map 120A.

By separating the safety boundaries and the zone boundaries into different maps or map views, it becomes simple and efficient for user to generate, define or update boundaries and understanding which boundaries need be at least confirmed on location.

In the examples herein it is shown how the various controls have been utilized to define the boundaries. In one example a boundary can be defined by simply selecting what type of boundary and drawing the boundary on the display. The selection of type may be done prior to drawing the boundary or after. In some embodiments the boundary is defined by drawing the boundary and in some embodiments the boundary is defined by indicating positions of corners which are then connected automatically. In some embodiments, a boundary may be defined by indicating positions of some corners and drawing some segments. In some embodiments, a boundary or segment thereof may be adjusted. The adjustment may be by indicating new corner points, by dragging the boundary in places where needed or by redrawing (segment(s) of) the boundary.

It should be noted that any processing may be done in any, some or all of the controller 110 of the robotic work tool 100 and/or the controller 240A of the server 240 and that the processing may also be done partially in one controller 110/240A for supplemental processing in the other controller 110/240A. This is indicated in FIG. 2 in that a dashed arrow is shown between the server 240 and the robotic work tool 100 for indicating that information may be passed freely between them for (partial) processing.

Figure 4:
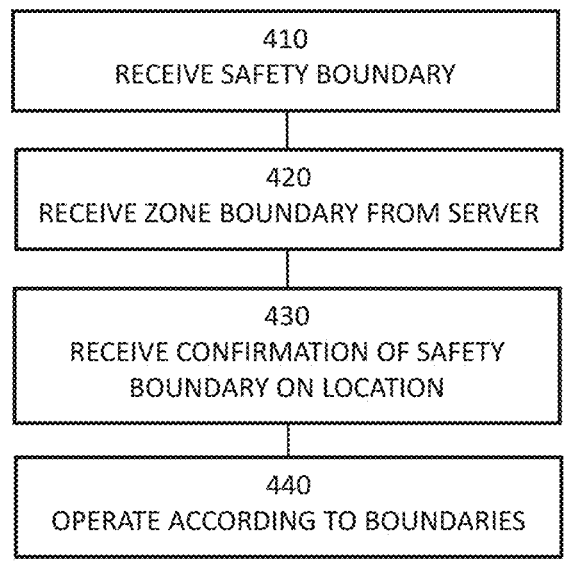
FIG. 4 shows a corresponding flowchart for a method according to some example embodiments of the teachings herein.

FIG. 4 shows a flowchart for a general method according to herein. The method is for use in a robotic work tool system as in FIG. 2 in a manner as discussed above in relation to FIGS. 3A, 3B, 3C, 3D, 3E namely for use in a robotic work tool system comprising a robotic work tool 100 arranged to operate in an operational area 205, wherein the robotic work tool 100 system possibly comprises a server 240.

The method comprises a controller of the robotic work tool system 200, such as the controller for executing a boundary-defining application (referenced 510 in FIG. 5) as discussed in the above, receiving 410 one or more safety boundaries 220, 220-1, 220-2 and storing these in a safety map 120A-1 of the operational area 205, receiving 420 one or more zone boundaries 220-3, 220-4, 220-5, 220-6 and storing these in a zone map 120A-2 of the operational area 205, and operating 440 according to the one or more zone boundaries 220-3, 220-4, 220-5, 220-6 and the one or more safety boundaries 220, 220-1, 220-2, wherein the one or more zone boundaries 220-3, 220-4, 220-5, 220-6 are related to an operating schedule and the one or more safety boundaries 220, 220-1, 220-2 are related to safety concerns for the robotic work tool 100. it should be noted that the one or more zone boundaries 220-3, 220-4, 220-5, 220-6 are received by the server 240. The method further comprises confirming 430 the one or more safety boundaries 220, 220-1, 220-2 on location in the operational area 205 prior to operating 440 according to the one or more safety boundaries 220, 220-1, 220-2.

As discussed herein and assumed under FIG. 4, the determinations are made by the server 240 and in such embodiments the controller is the controller 240A of the server 240.

In some embodiments, and as also discussed in the above, some processing may be done by the robotic work tool 100. In such embodiments the controller is the controller 110 of the robotic work tool 100.

And, in some embodiments the controller is the controller 110 of the robotic work tool 100 for performing some of the processing and the controller 240A of the server 240 for performing some of the processing for a shared processing, where some tasks are performed by one controller, and the remaining tasks by the other controller.

Figure 5:
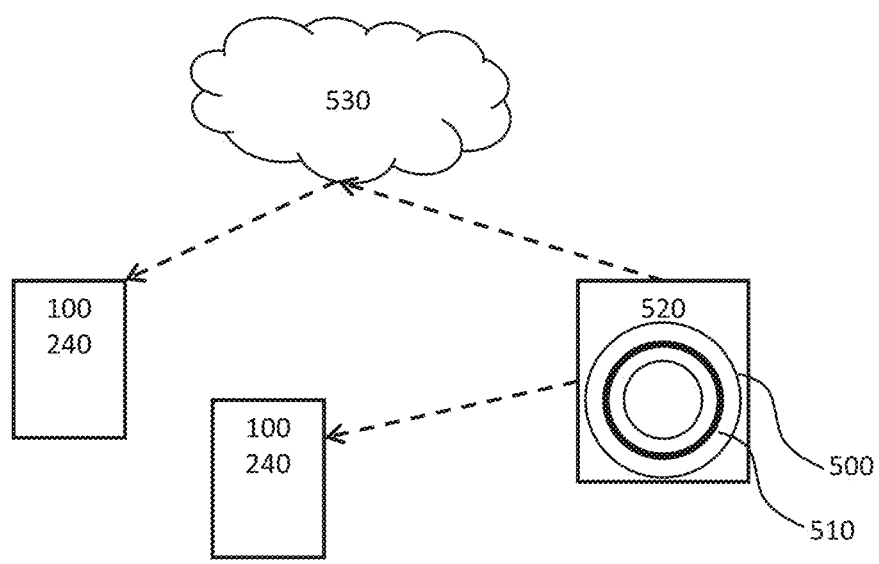
FIG. 5 shows a schematic view of a computer-readable medium carrying computer instructions that when loaded into and executed by a controller of a robotic work tool, enables the robotic work tool to implement the teachings herein.

FIG. 5 shows a schematic view of a computer-readable medium 500 carrying computer instructions 510 that when loaded into and executed by a controller of a computing device, such as a robotic work tool 100 or a server 240, enables the device to implement the teachings herein. The computer-readable instructions thus include a boundary-defining application as discussed in the above. In the example of FIG. 5, the device will be exemplified as the robotic work tool 100. The computer-readable medium 500 may be tangible such as a hard drive or a flash memory, for example a USB memory stick or a cloud server. Alternatively, the computer-readable medium 500 may be intangible such as a signal carrying the computer instructions enabling the computer instructions to be downloaded through a network connection, such as an internet connection. In the example of FIG. 5, a computer-readable medium 500 is shown as being a hard drive or computer disc 500 carrying computer-readable computer instructions 510, being inserted in a computer disc reader 520. The computer disc reader 520 may be part of a cloud server 530—or other server—or the computer disc reader 520 may be connected to a cloud server 530—or other server. The cloud server 530 may be part of the internet or at least connected to the internet. The cloud server 530 may alternatively be connected through a proprietary or dedicated connection. In one example embodiment, the computer instructions are stored at a remote server 530 and be downloaded to the memory 120 of the robotic work tool 100 for being executed by the controller 110 or to the memory 240B of the server 240 to be executed by the controller 240A.

The computer disc reader 520 may also or alternatively be connected to (or possibly inserted into) a robotic work tool 100 or server 240 for transferring the computer-readable computer instructions 510 to a controller of the robotic work tool 100 or server 240 (presumably via a memory of the robotic work tool 100 or server 240).

FIG. 5 shows both the situation when a device, such as a robotic work tool 100 or a server 240, receives the computer-readable computer instructions 510 via a server connection and the situation when another device, such as a robotic work tool 100 or a server 240, receives the computer-readable computer instructions 510 through a wired interface. This enables for computer-readable computer instructions 510 being downloaded into a device, such as a robotic work tool 100 or a server 240, thereby enabling the device, such as a robotic work tool 100 or a server 240, to operate according to and implement the teachings as disclosed herein.

The invention claimed is:

1. A method for use in a robotic work tool system comprising a server and a robotic work tool arranged to operate in an operational area based on a satellite navigation sensor, wherein the method comprises:
    receiving one or more safety boundaries defining boundaries for operating based on the satellite navigation sensor and storing the one or more safety boundaries in a safety map of the operational area,
    receiving one or more zone boundaries defining boundaries for operating based on the satellite navigation sensor and storing the one or more zone boundaries in a zone map of the operational area, and
    operating based on the satellite navigation sensor according to the one or more zone boundaries and the one or more safety boundaries, wherein the one or more zone boundaries are within at least one of the one or more safety boundaries and the one or more safety boundaries are related to safety concerns for the robotic work tool and wherein the method is characterized in that
    the one or more zone boundaries defining boundaries for operating based on the satellite navigation sensor are received by the server and in that
    the method further comprises confirming the one or more safety boundaries on location in the operational area prior to operating according to the one or more safety boundaries.

2. The method according to claim 1, wherein the one or more safety boundaries are received by the robotic work tool being navigated around an intended safety boundary.

3. The method according to claim 2, wherein the one or more safety boundaries received by the robotic work tool are confirmed by an operator through the server.

4. The method according to claim 2, wherein the one or more received safety boundaries are confirmed through a proving demonstration under automatic position control.

5. The method according to claim 1, wherein at least one received boundary is an update of a boundary.

6. The method according to claim 1, wherein the method further comprises downloading the safety map to the robotic work tool, downloading the zone map to the robotic work tool, or downloading the safety map and the zone map as a composite map to the robotic work tool.

7. The method according to claim 1, wherein the method further comprises confirming at least one of the one or more safety boundaries on location by remote-controlling the robotic work tool to follow the at least one safety boundary.

8. The method according to claim 1, wherein the method further comprises confirming at least one of the one or more safety boundaries on location by being downloaded to the robotic work tool through a short-range interface.

9. The method according to claim 1, wherein the method further comprises confirming at least one of the one or more safety boundaries on location by being receiving actions on a user interface of the robotic work tool.

10. The method according to claim 1, wherein the method further comprises confirming at least one of the one or more safety boundaries on location by a user that is physically in the operational area.

11. The method according to claim 1, wherein the method further comprises confirming at least one of the one or more safety boundaries on location by a user that is physically within a range of 1, 5 or 10 meters of the operational area.

12. The method according to claim 1, wherein the method further comprises the one or more safety boundaries being received by the server.

13. The method according to claim 1, wherein the method further comprises receiving the confirmation of the safety boundaries in the server on location.

14. The method according to claim 1, wherein the method further comprises receiving the confirmation of the safety boundaries in the robotic work tool.

15. The method according to claim 1, wherein the method further comprises receiving the confirmation of the zone boundaries in the server remotely from the operational area.

16. The method according to claim 1, wherein the robotic work tool is not configured with sensors for sensing a physical boundary.

17. The method according to claim 1, wherein the robotic work tool is a robotic lawnmower.

18. A method for use in a robotic work tool system comprising a server and a robotic work tool arranged to operate in an operational area based on a satellite navigation sensor, wherein the method comprises: receiving one or more safety boundaries defining boundaries for operating based on the satellite navigation sensor and storing these the one or more safety boundaries in a safety map of the operational area, receiving one or more zone boundaries defining boundaries for operating based on the satellite navigation sensor and storing these the one or more zone boundaries in a zone map of the operational area, and operating based on the satellite navigation sensor according to the one or more zone boundaries and the one or more safety boundaries, wherein the one or more zone boundaries are within at least one of the one or more safety boundaries and the one or more safety boundaries are related to safety concerns for the robotic work tool and wherein the method is characterized in that the one or more zone boundaries defining boundaries for operating based on the satellite navigation sensor are received by the server and in that the method further comprises confirming the one or more safety boundaries on location in the operational area prior to operating according to the one or more safety boundaries; the method comprising a computer-readable medium carrying computer instructions that when loaded into and executed by a controller of a robotic work tool.

19. A robotic work tool system comprising a server and a robotic work tool arranged to operate in an operational area based on a satellite navigation sensor, wherein a controller of the robotic work tool system is configured to:
receive one or more safety boundaries defining boundaries for operating based on the satellite navigation sensor and storing the one or more safety boundaries in a safety map of the operational area,
receive one or more zone boundaries defining boundaries for operating based on the satellite navigation sensor and storing the one or more zone boundaries in a zone map of the operational area,
and
operate based on the satellite navigation sensor according to the one or more zone boundaries and the one or more safety boundaries, wherein the one or more zone boundaries are within at least one of the one or more safety boundaries and the one or more safety boundaries are related to safety concerns for the robotic work tool and wherein the robotic work tool system is characterized in that
the one or more zone boundaries defining boundaries for operating based on the satellite navigation sensor are received by the server and in that
the controller of the robotic work tool system is further configured to confirm the one or more safety boundaries on location in the operational area prior to operating according to the one or more safety boundaries.

20. A robotic work tool arranged to operate in an operational area based on a satellite navigation sensor, wherein a controller of the robotic work tool is configured to:
receive one or more safety boundaries,
receive one or more zone boundaries defining boundaries for operating based on the satellite navigation sensor, and
operate based on the satellite navigation sensor according to the one or more zone boundaries and the one or more safety boundaries, wherein the one or more zone boundaries are within at least one of the one or more safety boundaries and the one or more safety boundaries are related to safety concerns for the robotic work tool and wherein the robotic work tool is characterized in that
the one or more zone boundaries defining boundaries for operating based on the satellite navigation sensor are received from a server and in that
the controller of the robotic work tool is further configured to confirm the one or more safety boundaries on location in the operational area prior to operating according to the one or more safety boundaries.

* * * * *